US011251668B2

(12) United States Patent
Ogihara et al.

(10) Patent No.: US 11,251,668 B2
(45) Date of Patent: Feb. 15, 2022

(54) BRUSHLESS MOTOR AND METHOD FOR PRODUCING SAME

(71) Applicant: MITSUBA Corporation, Gunma (JP)

(72) Inventors: Shigeru Ogihara, Gunma (JP); Naoyuki Miyashita, Gunma (JP); Takahiro Uchidate, Gunma (JP); Miku Takahashi, Gunma (JP); Daiki Yanagisawa, Gunma (JP)

(73) Assignee: MITSUBA Corporation, Gunma (JP)

( * ) Notice: Subject to any disclaimer, the term of this patent is extended or adjusted under 35 U.S.C. 154(b) by 193 days.

(21) Appl. No.: 16/649,974

(22) PCT Filed: Sep. 7, 2018

(86) PCT No.: PCT/JP2018/033167
§ 371 (c)(1),
(2) Date: Mar. 23, 2020

(87) PCT Pub. No.: WO2019/155670
PCT Pub. Date: Aug. 15, 2019

(65) Prior Publication Data
US 2020/0227962 A1    Jul. 16, 2020

(30) Foreign Application Priority Data

Feb. 9, 2018  (JP) .............................. JP2018-021521
May 14, 2018  (JP) .............................. JP2018-092987

(51) Int. Cl.
*H02K 1/28*  (2006.01)
*H02K 1/27*  (2006.01)
(Continued)

(52) U.S. Cl.
CPC ................ *H02K 1/28* (2013.01); *B60T 13/74* (2013.01); *F16D 65/18* (2013.01); *H02K 1/278* (2013.01);
(Continued)

(58) Field of Classification Search
CPC ............ H02K 1/28; H02K 1/30; H02K 1/278; H02K 7/102; H02K 15/03; H02K 21/16;
(Continued)

(56) References Cited

U.S. PATENT DOCUMENTS

2011/0025159 A1   2/2011   Wade
2012/0326548 A1*  12/2012  Nonaka .................... H02K 1/28
                                                      310/156.19

(Continued)

FOREIGN PATENT DOCUMENTS

CN    101174776    5/2008
CN    201160239    12/2008
(Continued)

OTHER PUBLICATIONS

"Search Report of Europe Counterpart Application", dated Oct. 5, 2021, pp. 1-9.

(Continued)

*Primary Examiner* — Thomas Truong
(74) *Attorney, Agent, or Firm* — JCIPRNET (57) ABSTRACT

A brushless motor with a rotor (17) which is axially supported within a stator in a rotatable manner is provided. The rotor (17) includes: a cylindrical rotor core (26) into which a shaft (19) is inserted; a ring magnet (29) which is affixed to the outer circumference of the rotor core (26), with an adhesive (28) being interposed therebetween; and a magnet cover (53). The magnet cover (53) covers the end faces of the rotor core (26) and the ring magnet (29) in the axial direction. The magnet cover (53) is provided with an adhesive pocket (58) which is in communication with the rotor core (26) and the ring magnet (29).

10 Claims, 8 Drawing Sheets

(51) Int. Cl.
  *H02K 15/03* (2006.01)
  *H02K 7/102* (2006.01)
  *B60T 13/74* (2006.01)
  *F16D 65/18* (2006.01)
  *H02K 21/16* (2006.01)
  *F16D 121/24* (2012.01)

(52) U.S. Cl.
  CPC ............. *H02K 7/102* (2013.01); *H02K 15/03* (2013.01); *H02K 21/16* (2013.01); *F16D 2121/24* (2013.01)

(58) Field of Classification Search
  CPC ....... H02K 1/2733; B60T 13/74; F16D 65/18; F16D 2121/24
  See application file for complete search history.

(56) References Cited

U.S. PATENT DOCUMENTS

| 2013/0187506 | A1* | 7/2013 | Lee | H02K 1/28 310/156.12 |
|---|---|---|---|---|
| 2015/0349596 | A1 | 12/2015 | Schnoell | |

FOREIGN PATENT DOCUMENTS

| CN | 101523699 | 9/2009 |
|---|---|---|
| CN | 101527486 | 9/2009 |
| CN | 102280957 | 12/2011 |
| CN | 102842977 | 12/2012 |
| CN | 103117619 | 5/2013 |
| CN | 103250329 | 8/2013 |
| CN | 203574463 | 4/2014 |
| CN | 104578494 | 4/2015 |
| CN | 106253517 | 12/2016 |
| CN | 106712400 | 5/2017 |
| DE | 10314394 | 10/2004 |
| DE | 112015004911 | 7/2017 |
| JP | H06327198 | 11/1994 |
| JP | H08182294 | 7/1996 |
| JP | 2001178041 | 6/2001 |
| JP | 2002204540 | 7/2002 |
| JP | 2003174745 | 6/2003 |
| JP | 2004364474 | 12/2004 |
| JP | 2005304287 | 10/2005 |
| JP | 2014195356 | 10/2014 |
| JP | 2016125512 | 7/2016 |

OTHER PUBLICATIONS

English translation of "International Preliminary Report on Patentability (Form PCT/IPEA/409) of PCT/JP2018/033167," dated Aug. 13, 2020, pp. 1-5.
Office Action of China Counterpart Application, with English translation thereof, dated Aug. 3, 2021, pp. 1-10.
"International Search Report (Form PCT/ISA/210) of PCT/JP2018/033167," dated Dec. 11, 2018, with English translation thereof, pp. 1-4.

* cited by examiner

BRUSHLESS MOTOR AND METHOD FOR PRODUCING SAME

CROSS-REFERENCE TO RELATED APPLICATION

This application is a 371 application of the International PCT application serial no. PCT/JP2018/033167, filed on Sep. 7, 2018, which claims the priority benefits of Japan Patent Application No. 2018-021521, filed on Feb. 9, 2018 and Japan Patent Application No. 2018-092987, filed on May 14, 2018. The entirety of each of the above-mentioned patent applications is hereby incorporated by reference herein and made a part of this specification.

BACKGROUND

Technical Field

The invention relates to a technology of a brushless motor having a rotor composed of a ring magnet adhered to a core unit.

Description of Related Art

The brushless motor has a rotor provided with a magnet for a magnetic field and a stator provided with an armature winding. The position of the rotor is detected by a Hall element which is a magnetically sensitive element, and the timing of energizing each stator coil is controlled by an inverter based on a detection signal of the Hall element. The rotor includes a surface magnet type (SPM), in which a plurality of magnets are attached to an outer circumference of the rotor, and an interior magnet type (IPM), in which a plurality of permanent magnets are embedded in the rotor. In addition, there is a type with a ring magnet provided on the rotor, and this type of rotor has a ring magnet in which N-poles and S-poles serving as magnetic poles are staggered in a circumferential direction and alternately magnetized in a cylindrical member made of a magnetic material.

Patent Documents 1 and 2 each disclose a rotor, i.e., a rotary body, provided with a ring magnet.

On the other hand, Patent Document 3 discloses a parking brake device for a vehicle having a brushless motor, and this brake device has a caliper disposed to straddle a part of a brake disc attached to an axle. The caliper includes a cylinder part provided with a piston, and a claw part facing the cylinder part via a brake disc, and pads pressed by the brake disc are provided on the piston and the claw part. When the brake pedal is operated, hydraulic pressure is supplied to the piston, and respective pads are pressed against the brake disc to apply a braking force to the axle. A feed screw member rotationally driven by a brushless motor via a reduction gear is screw-coupled to the piston, and when the parking brake switch is operated, the piston is driven by the feed screw member to apply a braking force to the axle. Although Patent Document 3 discloses a parking brake device, if, instead of a piston, a reciprocating member provided with pads is driven by a motor, the brake device becomes an electric brake that is used even when the vehicle is running.

RELATED ART

Patent Document(s)

Patent Document 1: Japanese Laid-open No. 8-182294
Patent Document 2: Japanese Laid-open No. 2003-174745
Patent Document 3: Japanese Laid-open No. 2016-125512

SUMMARY

Problems to be Solved

Since a rotor provided with a ring magnet is formed by magnetizing the magnetic poles on a cylindrical member integrally formed of a magnetic material, the magnetic poles can be evenly distributed in the circumferential direction. Further, the rotor can be manufactured in a small number of assembly steps. Therefore, the rotor provided with the ring magnet has an advantage that a high-precision brushless motor can be manufactured at low costs.

However, since the ring magnet is fixed by an adhesive outside the core unit attached to the shaft, when manufacturing the rotor, the adhesive may leak from between the core unit and the ring magnet. If the adhesive leaks out of the rotor, the adhesive may adhere to the outer surface of the rotor or adhere to the jig for assembling the rotor. For this reason, operation processes such as inspection and cleaning of the rotor, cleaning of the jig, etc. will increase, and the manufacturing efficiency of the motor will decrease. In addition, after the adhesive adhered to the outer surface of the rotor is cured, it is peeled off and becomes an adhesive piece and scatters in the brushless motor, so the adhesive piece may bite into the motor and cause a malfunction, which is a problem particularly in a motor requiring high reliability, such as the above-described motor for a brake device.

An objective of the invention is to improve the quality and manufacturing efficiency of a brushless motor having a ring magnet.

Means for Solving the Problems

A brushless motor according to the invention is a brushless motor including a stator and a rotor axially supported within the stator in a rotatable manner. The rotor includes a cylindrical rotor core through which a shaft is inserted, a ring magnet fixed to an outer circumference of the rotor core via an adhesive, and a magnet cover attached to the shaft and covering axial end faces of the rotor core and the ring magnet. An adhesive pocket communicating between the rotor core and the ring magnet is provided on the magnet cover.

A method for producing a brushless motor according to the invention is a method for producing a brushless motor including a stator and a rotor axially supported within the stator in a rotatable manner. The method for producing the brushless motor includes the following processes: a mounting process of mounting a rotor core and a magnet cover on a shaft, where the magnet cover has a larger diameter than the rotor core and covers one end face of the rotor core; an application process of applying an adhesive to an outer circumferential surface of the rotor core; and a fitting process of fitting a ring magnet to the outside of the rotor core by moving the ring magnet in an axial direction from another end face side of the rotor core toward the magnet cover, while forming an adhesive layer between the rotor core and the ring magnet and leaking the adhesive into an adhesive pocket provided on the magnet cover.

Effects

The rotor of the brushless motor has a ring magnet fixed to the outer circumference of the rotor core by an adhesive, the axial end faces of the rotor core and the ring magnet are covered by the magnet cover attached to the shaft, and an adhesive pocket is provided on the magnet cover. Therefore, when the ring magnet is fitted to the outer circumference of the rotor core, the adhesive enters the adhesive pocket and is prevented from leaking out of the rotor. Thereby, the adhesive is prevented from adhering to the jig for assembling the rotor, operations such as cleaning of the jig are not required, and the manufacturing efficiency of the motor can be improved. Since the magnet cover is adhered to the rotor core and the ring magnet by the adhesive which has entered the pocket, the strength of the rotor is increased.

DESCRIPTION OF THE EMBODIMENTS

Figure 1:
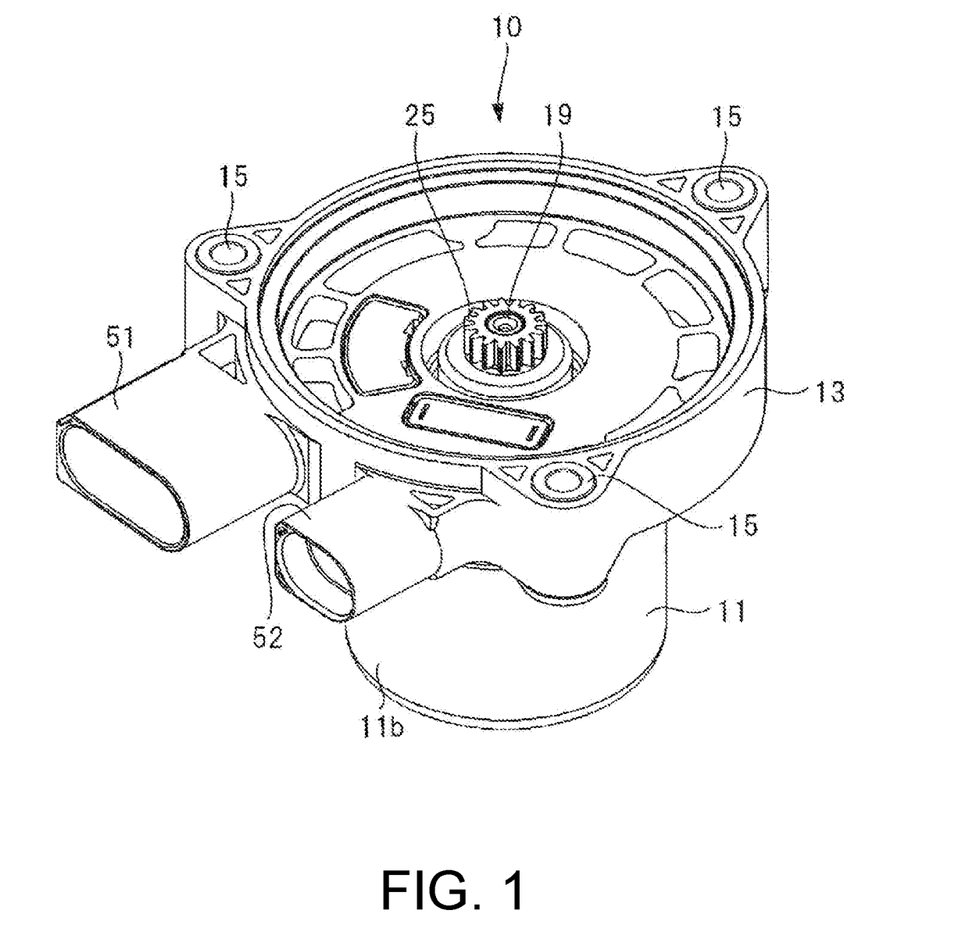
FIG. 1 is a perspective view showing a brushless motor according to an embodiment.
Figure 2:
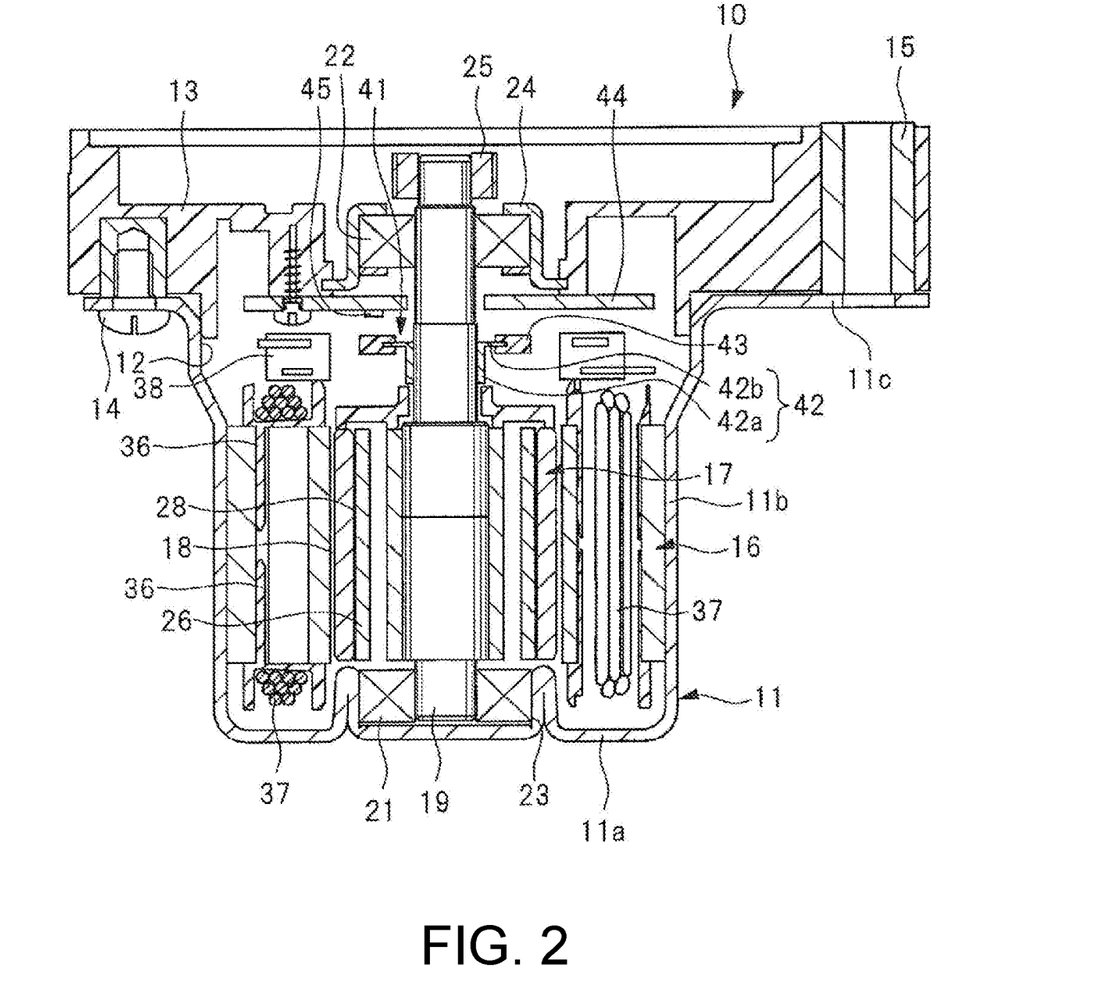
FIG. 2 is a vertical sectional view of FIG. 1.

Hereinafter, embodiments of the invention will be described in detail with reference to the drawings. As shown in FIG. 1 and FIG. 2, a brushless motor 10 includes a motor case 11. The motor case 11 is formed by subjecting a metal plate to press working such as deep drawing and has a bottom wall part 11a and a cylindrical part 11b as shown in FIG. 2. A flange part 11c is provided at an open end part 12 of the cylindrical part 11b. A bracket 13 made of a resin material is attached to the flange part 11c by a plurality of screw members 14.

A plurality of collars 15 are attached to the bracket 13, and the brushless motor 10 is attached to a member (not shown) by screw members penetrating each of the collars 15. The brushless motor 10 may be applied for driving a brake device of an automobile. In that case, the motor case 11 is attached to a reduction gear by screw members penetrating the collars 15.

As shown in FIG. 2, a stator 16 is fixed to the cylindrical part 11b of the motor case 11, and a rotor 17 is axially supported within the stator 16 in a rotatable manner with an air gap, i.e., a gap 18, therebetween. The rotor 17 has a shaft 19 of a motor. A base end part of the shaft 19 is axially supported on the motor case 11 in a rotatable manner by a bearing 21, and a distal end part is axially supported on the bracket 13 in a rotatable manner by a bearing 22. The bearing 21 is mounted on a cylindrical part 23 provided on the bottom wall part 11a of the motor case 11, and the bearing 22 is mounted on a holder 24 attached to the bracket 13.

Assuming that the lower end part of the shaft 19 in FIG. 2 is the base end part of the shaft 19 and the upper end part is the distal end part, a pinion gear 25 is attached to the distal end part. The rotation of the pinion gear 25 is transmitted to a feed screw shaft via a reduction gear mechanism (not shown). The feed screw shaft is screw-coupled to a reciprocating member which is mounted on a caliper of the brake device to be reciprocable in the axial direction. Pads which are pressed against the brake disc of the electric brake device of the automobile are respectively provided on the reciprocating member and a claw part of the caliper facing the reciprocating member, and a braking force is applied to the automobile by the brushless motor 10.

Figure 3:
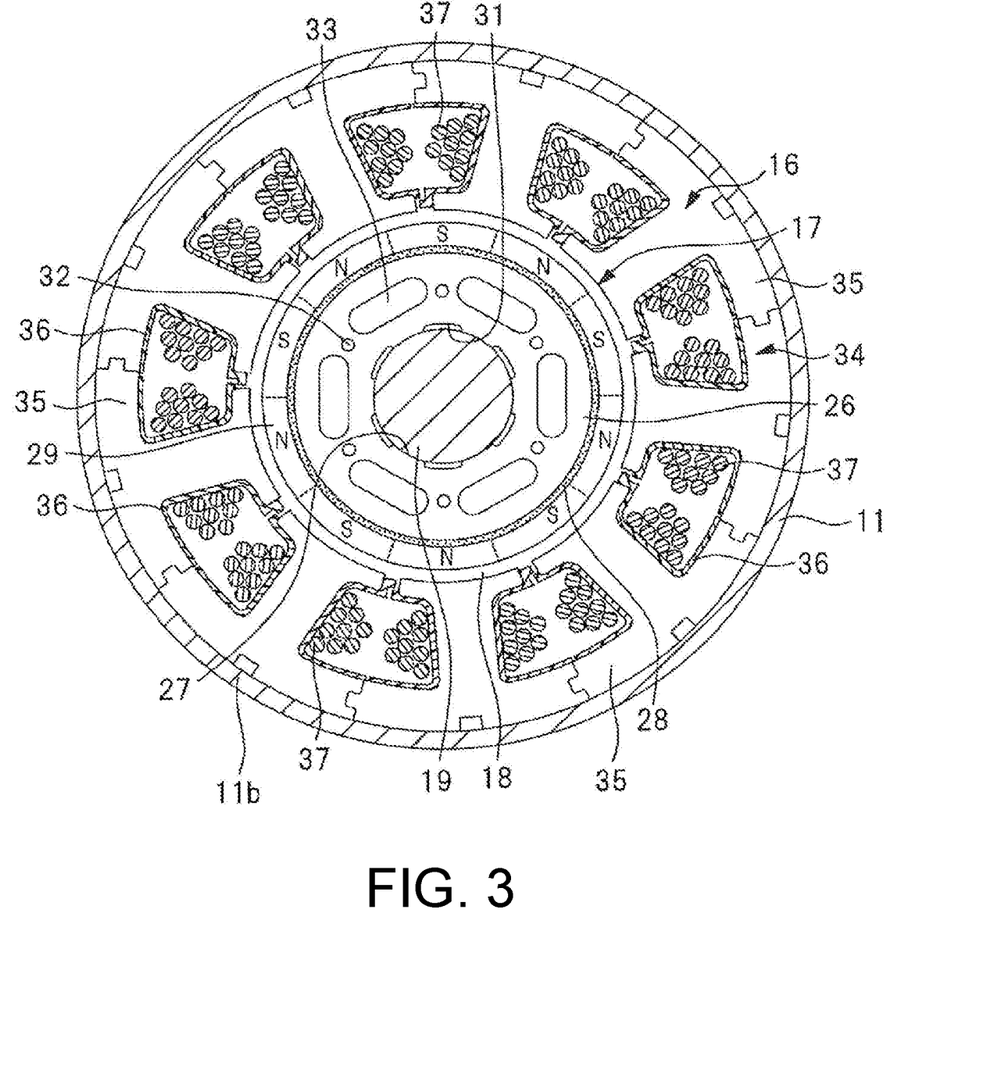
FIG. 3 is a cross-sectional view of FIG. 2.

As shown in FIG. 3, the rotor 17 has a cylindrical rotor core 26, and the shaft 19 is inserted through an insertion hole 27 of the rotor core 26. A ring magnet 29 is fixed to an outer circumference of the rotor core 26 by an adhesive 28. A plurality of concave grooves 31 are provided in the insertion hole 27 to extend in the axial direction. The rotor core 26 is formed by laminating a plurality of metal plates (electromagnetic steel plates) punched in a substantially annular shape by press working. A through hole 32 for positioning during lamination and a through hole 33 for reducing the weight of the rotor core 26 are formed in each metal plate.

The ring magnet 29 is formed by staggering N-poles and S-poles serving as magnetic poles in the circumferential direction and alternately magnetizing the N-poles and S-poles on a cylindrical member made of a magnetic material. The ring magnet 29 shown in FIG. 3 has ten magnetic poles magnetized in the circumferential direction, and the rotor 17 has ten poles. In FIG. 3, the boundary between the magnetic poles of the ring magnet 29 is indicated by a broken line. As such, the brushless motor 10 is of a ring magnet type, and as described above, unlike the surface magnet-type or interior magnet-type rotor, the magnetic poles can be evenly distributed in the circumferential direction, and also the rotor 17 can be manufactured in a small number of assembling steps. In the surface magnet-type rotor, the arc-shaped magnet attached to the outer circumference of the cylindrical member may come off, while the ring magnet 29 can improve the durability of the motor.

The stator 16 has a stator core 34 having a substantially cylindrical shape. As shown in FIG. 3, the stator core 34 is formed by combining nine teeth parts 35 in the circumferential direction. Each teeth part 35 is formed by laminating a plurality of metal plates (electromagnetic steel plates) punched by press working. Each metal plate is provided with a through hole (not shown) for positioning during lamination. An insulator 36 made of an insulating resin material is attached to each of the teeth parts 35, and a coil 37 is wound around the outside of the insulator 36. The coil 37 is wound around the nine teeth parts 35, and the stator 16 shown in FIG. 3 has nine coils 37.

Each of the coils 37 constitutes three phases, i.e., a U phase, a V phase, and a W phase, sequentially in the circumferential direction, and each phase is formed by three coils 37. As shown in FIG. 2, a bus bar unit 38 is disposed at an end face on the distal end side of the stator 16. The bus bar unit 38 electrically connects the terminal of each coil 37 with an external power supply. A sensor disk 41 is attached to the shaft 19 in order to detect the position of the rotor 17 in the rotation direction. The sensor disk 41 includes a base part 42 having a cylindrical part 42a fitted to the shaft 19 and a disk part 42b provided at one end of the cylindrical part 42a, and an annular part 43 provided on the cylindrical part 42a, and the annular part 43 is provided with a magnet. A sensor substrate 44 is attached to the bracket 13 to face the sensor disk 41, and a Hall element 45 which is sensitive to the magnetic force of the magnet provided on the sensor disk 41 is provided.

Figure 4:
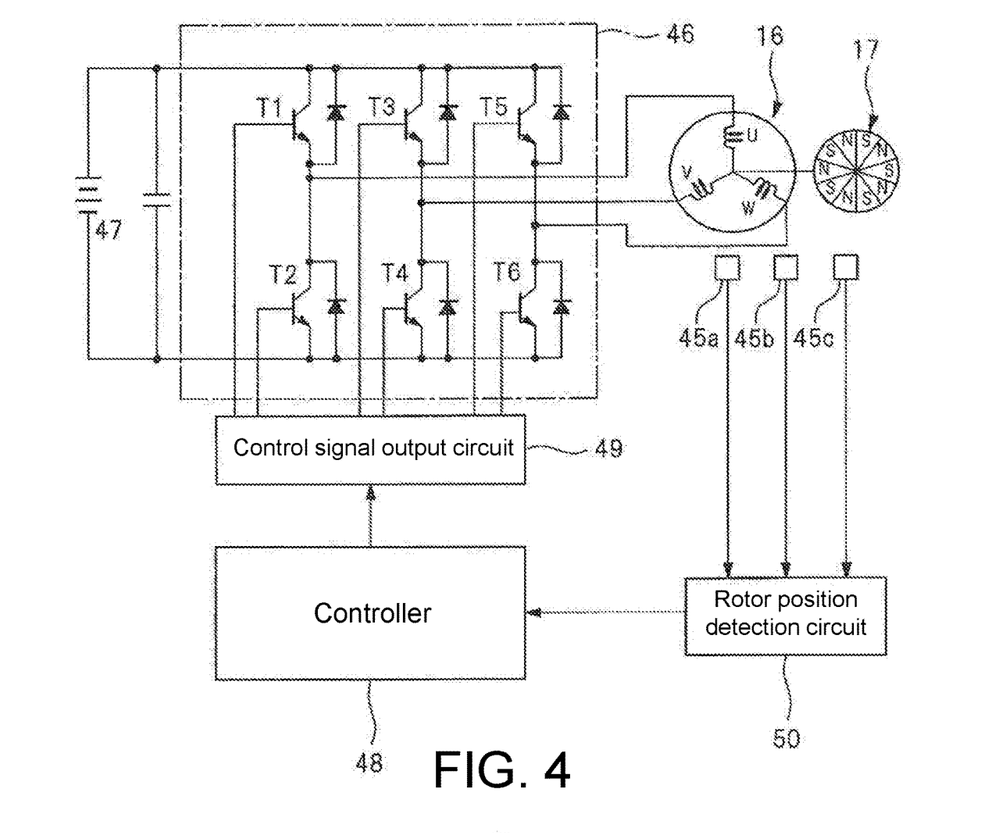
FIG. 4 is a block diagram showing a rotation control circuit of a motor.

FIG. 4 is a block diagram showing a rotation control circuit of a motor. The rotation control circuit has three Hall elements 45a to 45c corresponding to the three-phase coils, and each Hall element is attached to the sensor substrate 44 shown in FIG. 2 as described above. Although FIG. 2 shows one Hall element 45 on the sensor substrate 44, three Hall elements 45a to 45c are provided on the sensor substrate 44 to be staggered in the circumferential direction. Each of the Hall elements 45a to 45c is a magnetic field detection element which detects the magnetic flux of the magnet provided on the annular part 43 to output a detection signal when the polarity of the magnetic pole part of the rotor 17 changes from the N-pole to the neutral point of the S-pole. Based on the detection signal from the Hall elements, the position of the rotor 17 is detected, and an energization switching operation on each coil 37 is performed. The sensor for detecting the rotation position is not limited to the Hall element but may be a Hall IC in which an electronic element having a comparator function and a Hall element are integrated into one chip.

The rotation control circuit of the motor has an inverter circuit 46 for controlling a drive current for each of the U-phase, V-phase, and W-phase coils 37. The inverter circuit 46 is a three-phase full-bridge inverter circuit and has two switching elements T1 and T2, two switching elements T3 and T4, and two switching elements T5 and T6 respectively connected in series, each of which is connected to the positive and negative output terminals of a DC power supply 47. One connection terminal of the U-phase coil 37 is connected between the two switching elements T1 and T2. One connection terminal of the V-phase coil 37 is connected between the two switching elements T3 and T4. One connection terminal of the W-phase coil 37 is connected between the two switching elements T5 and T6. The other connection terminals of the U-phase, V-phase, and W-phase coils 37 are connected to each other, and the coils 37 are star-connected. The connection method may also be a delta connection. By adjusting the timing of the control signal supplied to each switching element, the commutation operation on the coils 37 is controlled.

The rotation control circuit of the motor has a controller 48, and a control signal is sent from the controller 48 to the inverter circuit 46 via a control signal output circuit 49. Detection signals of the Hall elements 45a to 45c which serve as rotation position detection sensors are sent to a rotor position detection circuit 50. A signal is sent from the rotor position detection circuit 50 to the controller 48. The controller 48 has a microprocessor for calculating a control signal and a memory for storing a control program, data, etc.

The inverter circuit 46, the controller 48, the rotor position detection circuit 50, etc. are provided outside the motor, and as shown in FIG. 1, lead wires connecting one connection terminal of the coil of each phase and the inverter circuit 46 are guided to the outside through a cable guide 51 provided on the bracket 13. Lead wires connecting the three Hall elements 45a to 45c and the rotor position detection circuit 50 are guided to the outside through a cable guide 52 provided on the bracket 13.

Figure 5:
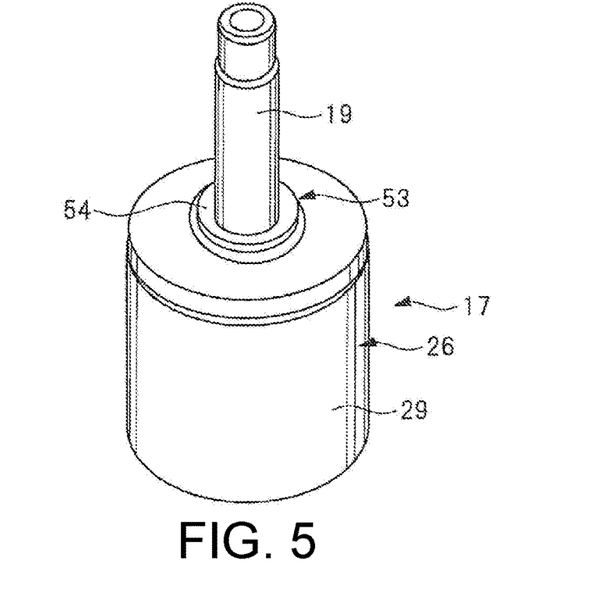
FIG. 5 is a perspective view of the rotor shown in FIG. 1.
Figure 6:
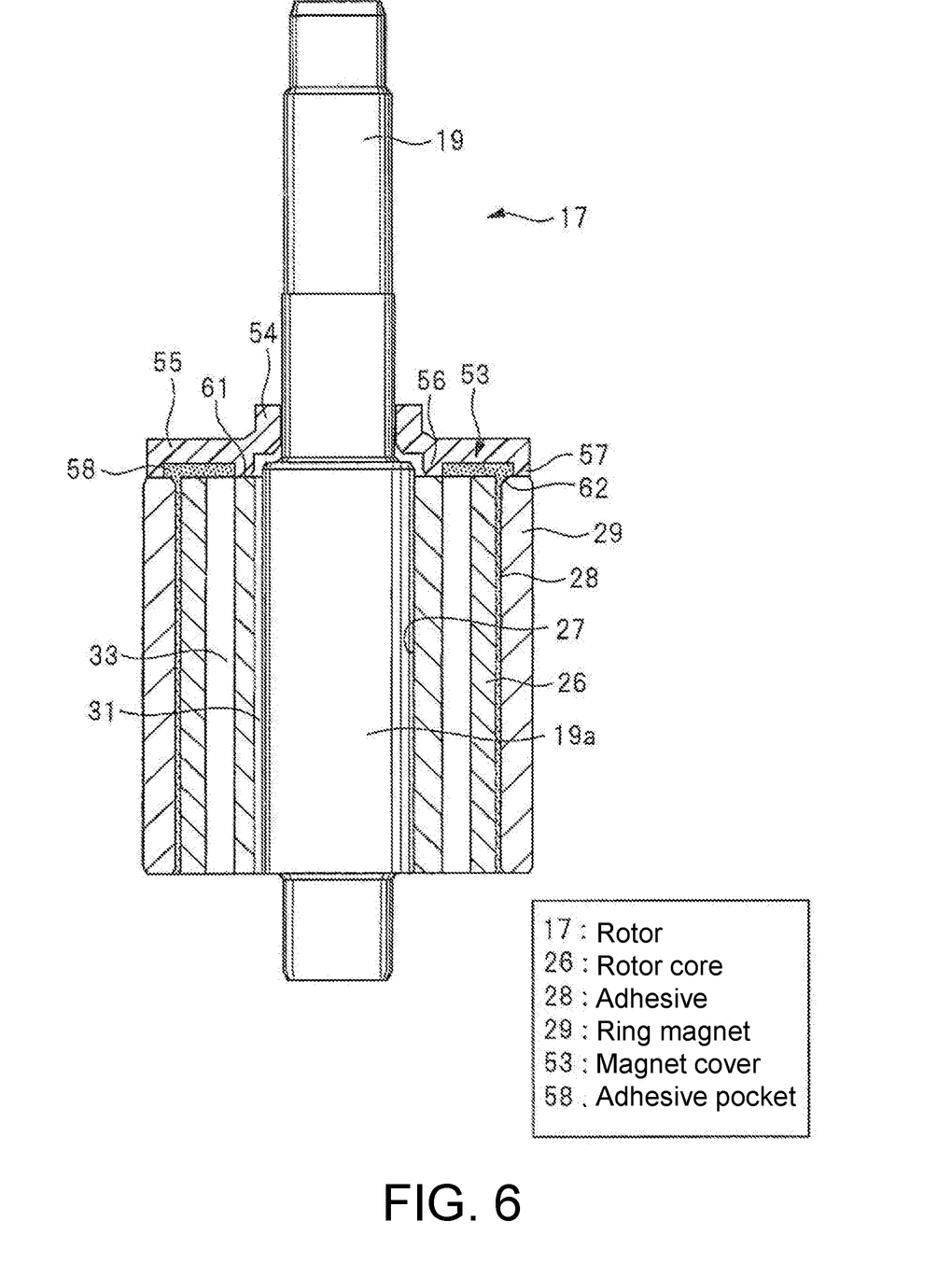
FIG. 6 is an enlarged vertical sectional view of FIG. 5.
Figure 7:
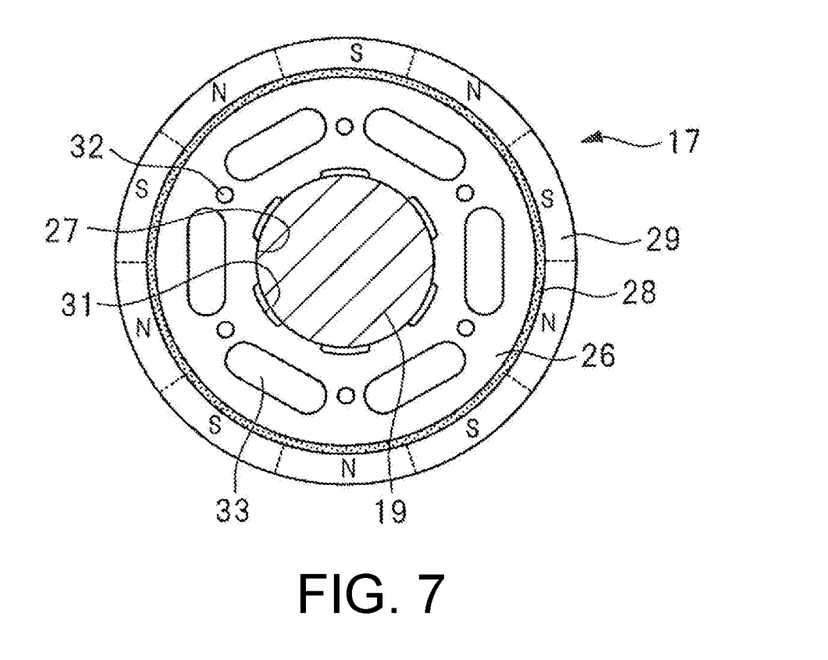
FIG. 7 is a cross-sectional view of FIG. 6.

FIG. 5 is a perspective view of the rotor shown in FIG. 1, and FIG. 6 is an enlarged vertical sectional view of FIG. 5. A core mounting part 19a to which the rotor core 26 is mounted is provided on the base end part side of the shaft 19, and the core mounting part 19a has a larger diameter than other parts. A magnet cover 53 is mounted on the shaft 19 close to the core mounting part 19a. The magnet cover 53 is made of a resin material, has a boss part 54 fitted to the outer circumferential surface of the shaft 19 and a disk-shaped main body part 55 extending radially outward from the boss part 54, and covers one axial end face of the rotor core 26 and the ring magnet 29.

The main body part 55 of the magnet cover 53 is provided with an inner rib 56 projecting toward the radially inner part of the rotor core 26. The inner rib 56 is concentric with the shaft 19. In other words, it is concentric with the central axis of the shaft 19 and is circular when viewed from the axial direction of the shaft 19. The main body part 55 is provided with an outer rib 57 projecting toward the ring magnet 29. The outer rib 57 is provided on the main body part 55 to be located radially outward of the inner rib 56 and is concentric with the inner rib 56. The portion between the ribs among the inner rib 56, the outer rib 57, and the main body part 55 forms an adhesive pocket 58. The adhesive pocket 58 has an annular groove shape, and the adhesive pocket 58 is opened toward the axial end face of the rotor core 26 and the ring magnet 29. The adhesive pocket 58 communicates with a gap between the outer circumferential surface of the rotor core 26 and the inner circumferential surface of the ring magnet 29, i.e., the portion where the adhesive 28 is interposed.

The magnet cover 53 is adhered to the rotor core 26 and the ring magnet 29 by the adhesive 28 which has entered the adhesive pocket 58. When the rotor 17 is incorporated into the stator 16, as shown in FIG. 2, the magnet cover 53 is disposed on the inner side of the motor compared to the sensor disk 41. Therefore, even if the magnet cover 53 is separated from the rotor core 26 and the ring magnet 29, the displacement of the magnet cover 53 in the axial direction is suppressed by the sensor disk 41.

The rotor core 26 and the magnet cover 53 may be separate members or may also be an integrated member in which the metal rotor core 26 and the resin magnet cover 53 are combined in advance. In the form of separate members, the rotor core 26 and the magnet cover 53 are sequentially mounted on the shaft 19. On the other hand, in the case of an integrated member, the assembly of the rotor core 26 and the magnet cover 53 is mounted on the shaft 19. To manufacture an integrated rotor core 26 integrated with the magnet cover 53, the magnet cover 53 is insert-molded in a state in which a metal plate for forming the rotor core 26 is disposed in a resin molding die. At the time of insert molding, if the uneven parts and the through holes are formed in the metal plate in advance, the adhesion between the resin and the metal plate can be improved. By laminating the metal plate combined with the resin on other metal plates, the rotor core 26 can be manufactured. In addition, the magnet cover 53 may also be insert-molded on the rotor core 26 after assembling the rotor core 26 by laminating a plurality of metal plates.

Figure 9:
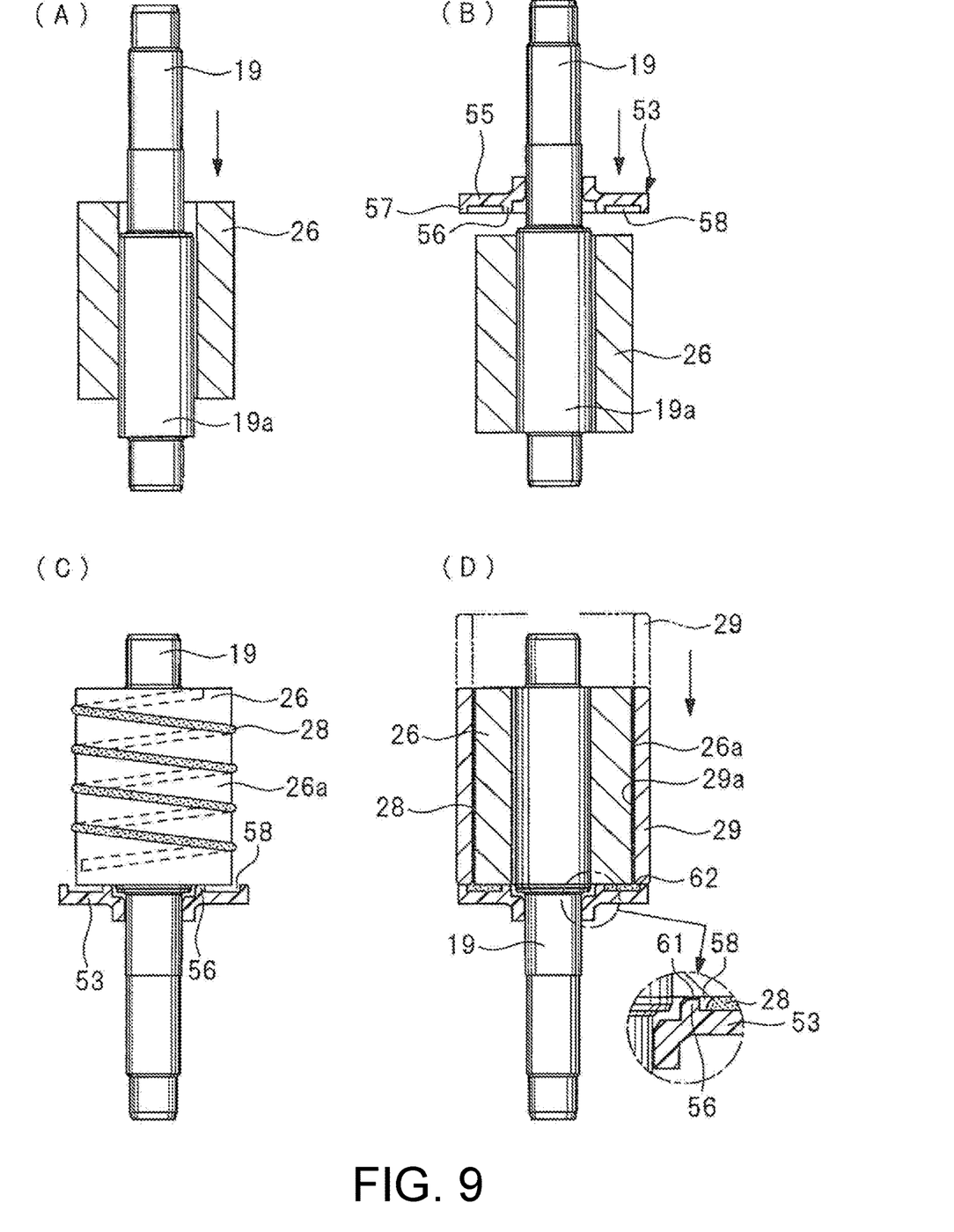

FIG. 9 is an assembly process diagram showing a method for producing the rotor 17. In the rotor 17, the rotor core 26 and the magnet cover 53 are separate members. (A) of FIG. 9 shows a first mounting process in which the rotor core 26 is mounted on the shaft 19. In the first mounting process, as indicated by an arrow, the rotor core 26 is mounted in the axial direction on the shaft 19 from the upper end side of the shaft 19, i.e., one end part side, with the base end part being on the lower side. Therefore, the shaft 19 is inserted into the rotor core 26, and as shown in (B) of FIG. 9, the rotor core 26 is fixed at the position of the core mounting part 19a.

Following the rotor core 26, as shown in (B) of FIG. 9, the magnet cover 53 is mounted on the shaft 19. In a second mounting process in which the magnet cover 53 is mounted on the shaft 19, as indicated by an arrow, the magnet cover 53 is mounted in the axial direction on the shaft from one end part side of the shaft 19. Therefore, the inner rib 56 comes into contact with the radially inner part of one end face of the rotor core 26. When the inner rib 56 is brought into slight contact with the rotor core 26, due to the surface roughness of at least one of the end face of the inner rib 56 and the end face of the rotor core 26, as shown in (D) of FIG. 9, a gap 61 having an extremely thin width of about 0.1 mm in the axial direction is formed between the inner rib 56 and the rotor core 26. The width of the gap 61 in the axial direction is set to 0.05 to 0.15 mm. To set the width of the gap 61 to a constant value, when mounting the magnet cover 53 on the shaft 19, a thickness gauge may be disposed between the end face of the rotor core 26 and the magnet cover 53.

After the inner rib 56 is brought into contact with the radially inner part of the rotor core 26 and the magnet cover 53 is mounted on the shaft 19, the shaft 19 is turned upside down as shown in (C) of FIG. 9. In this state, the adhesive 28 is applied to an outer circumferential surface 26a of the rotor core 26. In this application process, while discharging the adhesive 28 from a nozzle (not shown), by rotating the rotor core 26 and moving the nozzle in the axial direction along the rotor core 26, the adhesive 28 is spirally applied to the outer circumferential surface 26a. (C) of FIG. 9 shows a state in which the adhesive 28 is applied to the outer circumferential surface 26a in this manner. The application method of the adhesive 28 is not limited to such a method, and the adhesive 28 may also be applied to the outer circumferential surface 26a by a brush or may also be applied by spraying.

In (D) of FIG. 9, a state in which the ring magnet 29 is fitted to the outside of the rotor core 26 from the other end face side of the rotor core 26 and is moved in the axial direction toward the magnet cover 53 is indicated by two-dot chain lines. When the ring magnet 29 is moved to a position where it is brought into contact with the magnet cover 53 and the ring magnet 29 is fitted to the rotor core 26, as shown by solid lines in (D) of FIG. 9, the ring magnet 29 is brought into contact with the outer rib 57 of the magnet cover 53. As shown in (D) of FIG. 9, a tapered surface 62 whose diameter increases toward the end face is provided at the end part of the ring magnet 29, and when the ring magnet 29 is moved to a position where it is brought into contact with the magnet cover 53, the adhesive 28 applied to the outer circumferential surface 26a securely enters inside an inner circumferential surface 29a of the ring magnet 29.

When the ring magnet 29 is brought into contact with the magnet cover 53, the axial position of the ring magnet 29 with respect to the rotor core 26 is determined, and an adhesive layer composed of the adhesive 28 is formed between the outer circumferential surface 26a of the rotor core 26 and the inner circumferential surface 29a of the ring magnet 29. Further, part of the adhesive 28 applied to the outer circumferential surface 26a is pushed toward the magnet cover 53 by the end face of the ring magnet 29, and the adhesive 28 enters the adhesive pocket 58.

When the adhesive 28 enters the adhesive pocket 58, the air in the adhesive pocket 58 is discharged radially inward from the gap 61. As such, when the gap 61 is provided between the inner rib 56 and the rotor core 26, the air is exhausted from inside the adhesive pocket 58 to the outside due to the adhesive 28 pushed into the adhesive pocket 58, so that the adhesive 28 can easily enter the adhesive pocket 58. The outer rib 57 is in contact with the ring magnet 29 to prevent the adhesive 28 from leaking out of the rotor 17. Therefore, when the adhesive 28 is prevented from leaking out of the rotor 17, the adhesive is prevented from adhering to the assembly jig for assembling the rotor 17, and the manufacturing efficiency of the brushless motor 10 can be improved. Further, since the end face of the rotor core 26 and the magnet cover 53 are adhered by the adhesive 28 which has entered the adhesive pocket 58, the fixing strength of the rotor core 26 and the magnet cover 53 with respect to the shaft 19 is increased.

The amount of the adhesive 28 applied to the outer circumferential surface 26a of the rotor core 26 is preferably set to an amount which does not result in leaking out of the adhesive pocket 58 when the ring magnet 29 is fitted to the outside of the rotor core 26. However, if the adhesive 28 is flowed out from the adhesive pocket 58 toward the shaft 19 through between the inner rib 56 and the rotor core 26, the adhesive 28 enters the gap between the shaft 19 and the magnet cover 53, and the adhesive strength between the shaft 19 and the magnet cover 53 is increased without leaking the adhesive 28 to the outside of the rotor 17. For this reason, the inner rib 56 is brought into slight contact with the end face of the rotor core 26, while the end face of the ring magnet 29 is brought into strong contact with the outer rib 57. Thereby, the end face of the ring magnet 29 is in close contact with the outer rib 57, and leaking of the adhesive 28 from between the outer rib 57 and the ring magnet 29 can be prevented. In the case where a thermosetting adhesive is used as the adhesive 28, the rotor 17 is subjected to a heating treatment after the fitting process to cure the adhesive 28.

Figure 8:
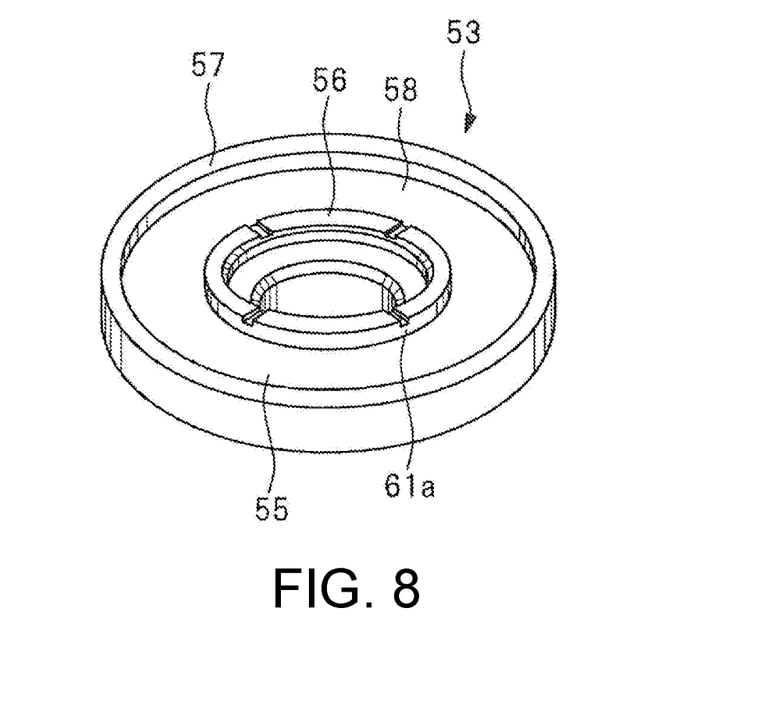
FIG. 8 is a perspective view showing a modified example of the magnet cover.
(A) to (D) of FIG. 9 are process diagrams showing an example of a method for producing the rotor.
(A) to (C) of FIG. 10 are process diagrams showing another method for producing the rotor.

FIG. 8 is a perspective view showing a modified example of the magnet cover 53. A plurality of grooves 61a for air venting are provided in the end face of the inner rib 56 of the magnet cover 53. Therefore, with the grooves 61a provided in the magnet cover 53, when the adhesive 28 enters the adhesive pocket 58, air can be discharged from the adhesive pocket 58 to the outside via the grooves 61a for air venting. The depth of the groove 61a is 0.05 to 0.15 mm, and the groove 61a is exaggerated in FIG. 8. In addition, instead of providing the grooves 61a for air venting in the magnet cover 53, the grooves 61a for air venting may be provided in a portion of the rotor core 26 with which the inner rib 56 of the magnet cover 53 comes into contact.

Figure 10:
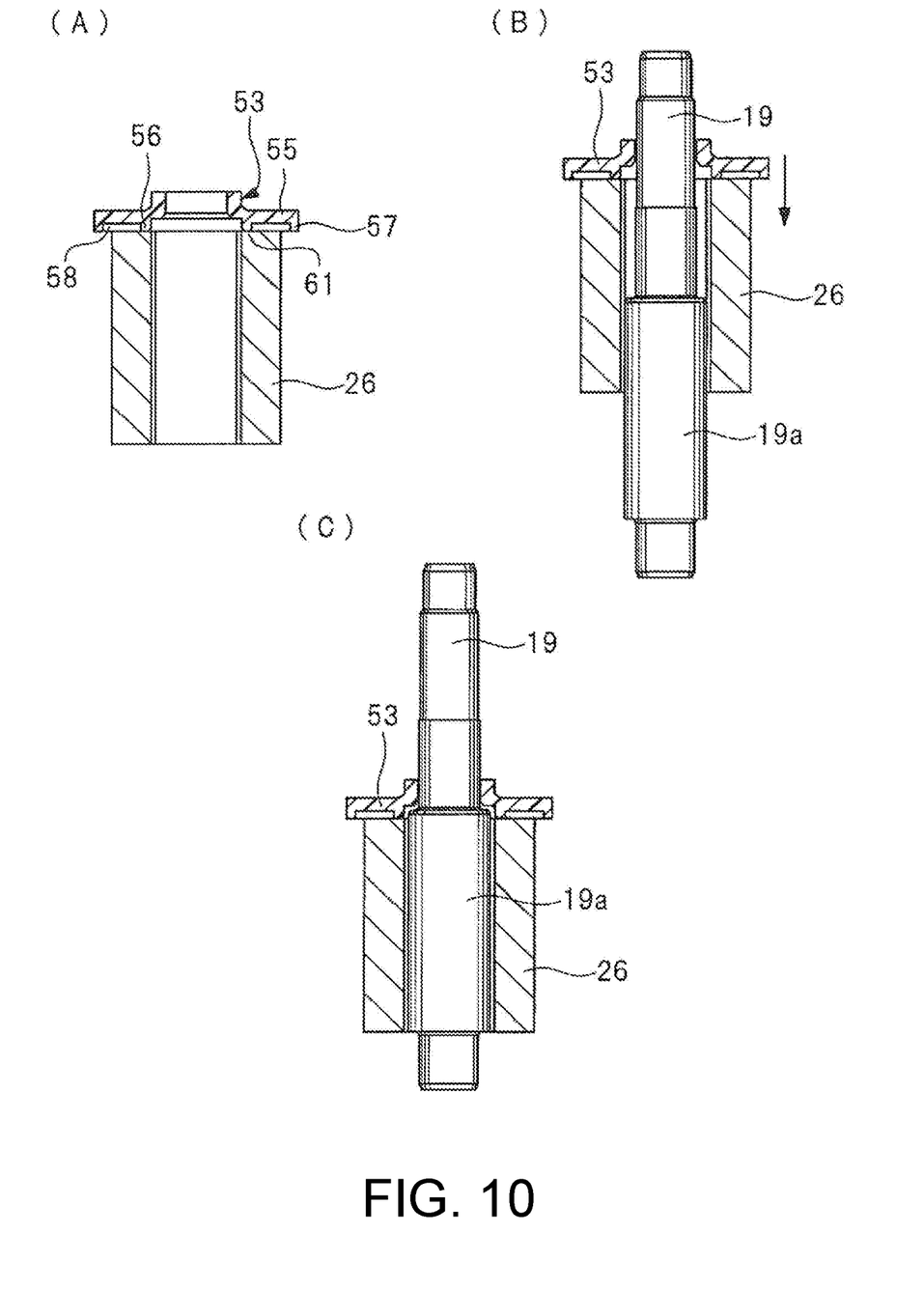

FIG. 10 is a process diagram showing another method for producing the rotor 17. (A) of FIG. 10 shows an integrated rotor core 26 in which the rotor core 26 and the magnet cover 53 are combined in advance by insert molding as described above. Similarly, in the integrated rotor core 26, a gap 61 is provided between the rotor core 26 and the inner rib 56 of the magnet cover 53, as in the case described above. (B) of FIG. 10 shows a state in which the integrated rotor core 26 is mounted on the shaft 19. (C) of FIG. 10 shows a state in which the rotor core 26 is mounted to a position where it is fitted to the core mounting part 19a.

In this way, after the rotor core 26 and the magnet cover 53 are mounted on the shaft 19, the adhesive 28 is applied to the outer circumferential surface of the rotor core 26 in the application process shown in (C) of FIG. 9. Further, the ring magnet 29 is fitted to the outside of the rotor core 26 in the fitting process shown in (D) of FIG. 9.

The invention is not limited to the above embodiments and may be variously modified without departing from the gist thereof. For example, the number of magnetic poles magnetized on the rotor 17 is not limited to ten poles as shown, but may also be two poles, four poles, eight poles, etc. Further, the number of the teeth parts 35 of the stator 16 around which the coil 37 is wound is not limited to nine as shown, but may also be any number as long as it is a multiple of three such as three or six.

What is claimed is:

1. A brushless motor comprising:
a stator; and
a rotor axially supported within the stator in a rotatable manner,
wherein the rotor comprises:
- a cylindrical rotor core through which a shaft is inserted;
- a ring magnet fixed to an outer circumference of the rotor core via an adhesive; and
- a magnet cover attached to the shaft and covering axial end faces of the rotor core and the ring magnet,
wherein an adhesive pocket communicating between the rotor core and the ring magnet is provided on the magnet cover, wherein
the magnet cover comprises:
- a main body part extending in a radial direction;
- an inner rib provided on the main body part, projecting toward the rotor core, and concentric with the shaft; and
- an outer rib provided on the main body part radially outward of the inner rib, projecting toward the ring magnet, and concentric with the inner rib,
- wherein the adhesive pocket is formed by the main body part, the inner rib, and the outer rib.

2. The brushless motor according to claim 1, wherein the outer rib is in contact with the ring magnet.

3. The brushless motor according to claim 1, wherein a gap for air venting is provided between the inner rib and the rotor core.

4. The brushless motor according to claim 3, wherein a dimension of the gap in an axial direction is 0.05 to 0.15 mm.

5. The brushless motor according to claim 1, wherein a groove for air venting is provided in at least one of the inner rib and the rotor core.

6. The brushless motor according to claim 1, wherein the magnet cover is made of a resin material.

7. The brushless motor according to claim 1, wherein the rotor core and the magnet cover are integrally formed.

8. The brushless motor according to claim 1, wherein the brushless motor is used for driving a brake device of an automobile.

9. A method for producing a brushless motor, the brushless motor comprising:
a stator; and
a rotor axially supported within the stator in a rotatable manner,
the method for producing the brushless motor comprising:
- a mounting process of mounting a rotor core and a magnet cover on a shaft, the magnet cover having a larger diameter than the rotor core and covering one end face of the rotor core;
- an application process of applying an adhesive to an outer circumferential surface of the rotor core; and
- a fitting process of fitting a ring magnet to the outside of the rotor core by moving the ring magnet in an axial direction from another end face side of the rotor core toward the magnet cover, while forming an adhesive layer between the rotor core and the ring magnet and leaking the adhesive into an adhesive pocket provided on the magnet cover, wherein the magnet cover comprises:
- a main body part extending in a radial direction;
- an inner rib provided on the main body part, projecting toward the rotor core, and concentric with the shaft; and
- an outer rib provided on the main body part radially outward of the inner rib, projecting toward the ring magnet, and concentric with the inner rib.

10. The method for producing the brushless motor according to claim 9, wherein the mounting process comprises:
- a first mounting process of mounting the rotor core from one end part side of the shaft; and
- a second mounting process of mounting the magnet cover from one end part side of the shaft toward one end face of the rotor core.

* * * * *